United States Patent [19]

Zhang et al.

[11] Patent Number: 5,168,910
[45] Date of Patent: Dec. 8, 1992

[54] NON-PNEUMATIC TIRE

[75] Inventors: Weitai Zhang, 246 Dong St., Qionglai County, Sichuan Province; Jisan Pu, Sichuan Province; Liangchen Lei, Sichuan Province; Youqiong Yang, Sichuan Province; Janxiong Liu, Sichuan Province; Jingcheng Mu, Sichuan Province, all of China

[73] Assignee: Weitai Zhang, Qionglai County, China

[21] Appl. No.: 817,984

[22] Filed: Jan. 8, 1992

Related U.S. Application Data

[63] Continuation of Ser. No. 269,364, Nov. 10, 1988, abandoned.

[30] Foreign Application Priority Data

Nov. 10, 1987 [CN] China .................................. 87107607

[51] Int. Cl.⁵ .................................................. B60C 7/10
[52] U.S. Cl. ...................................... 152/325; 152/328
[58] Field of Search ............... 152/319, 320, 322, 323, 152/324, 325, 157, 158, 520, 302, 323, 328

[56] References Cited

U.S. PATENT DOCUMENTS

| | | | |
|---|---|---|---|
| 679,280 | 7/1901 | Furlong | 152/328 |
| 941,508 | 11/1909 | Euchenhofer | 152/328 |
| 991,737 | 5/1911 | Moore | 152/302 |
| 1,331,358 | 2/1920 | Parrino | 152/319 |
| 1,400,151 | 12/1921 | Golein | 152/324 |
| 1,456,775 | 5/1923 | Hicks | 152/328 |

FOREIGN PATENT DOCUMENTS

| | | | |
|---|---|---|---|
| 0450500 | 9/1927 | Fed. Rep. of Germany | 152/319 |
| 0754361 | 2/1953 | Fed. Rep. of Germany | 152/325 |
| 58-145505 | 8/1983 | Japan | 152/302 |

Primary Examiner—Geoffrey L. Knable
Attorney, Agent, or Firm—Bradford E. Kile; Ruffin B. Cordell

[57] ABSTRACT

A non-pneumatic tire for mounting on a wheel rim having an inner surface with at least one circumferential groove around the entire tire. A plurality of circumferentially and evenly distributed, radially extending spacers separate the groove into multiple evenly distributed and mutually spaced chambers, within which air near atmospheric pressure may flow.

7 Claims, 1 Drawing Sheet

NON-PNEUMATIC TIRE

This application is a continuation of application Ser. No. 07/269,364 filed Nov. 10, 1988 now abandoned.

The present invention relates to a kind of non-pneumatic tire for vehicles. More specifically, this invention relates to a non-pneumatic tire which is mainly made through vulcanization of an integral caoutchouc.

Tires with a solid configuration were used for quite a long time following the development of rubber tires. However, because of their inadequate flexibility, high rolling friction during travel and large deformation and stress differences between various parts under loading, solid tires cracked easily and thus fell into gradual disuse. Pneumatic tires have been widely used and have demonstrated the following advantages: less material consumption, light weight, nice cushioning effect and a high compliance coefficient with road surface. A pneumatic tire usually consists of an outer cover and an inner tube. Its configuration is therefore complicated and frequent air-fillings are necessary, making it exceedingly inconvenient to use. Also, a pneumatic tire punctures easily and the resulting leak will affect tire performance. In severe cases, vehicles may get out of control, causing accidents. Currently, many countries are developing non-pneumatic tires to increase both the travel safety of vehicles such as those used by the military and their adaptability to various road surfaces. In recent years, many kinds of non-pneumatic or semi-pneumatic tires have been suggested and are being developed. However, there still exist some difficult problems to be solved, including a complex configuration which is not easy to fabricate, difficulties in both mounting and dismounting the tire, reduced riding comfort due to inadequate flexibility or increased rolling friction, and not achieving the requirements for travelling speed and operating life. Generally, non-pneumatic tires cannot compete with pneumatic tires. For example, a kind of non-pneumatic tire molded by high speed injection of polyurethane, produced in both the United States and Japan, is not widely used except in high grade sedans because of the cost of material. Thus, the tire market is mostly occupied now by pneumatic tires.

An object of the present invention is to overcome the previously-mentioned drawbacks of various kinds of tires. Further objects of the invention are a kind of non-pneumatic tire which adapts to a wide road surface, which provides travelling performance comparable to pneumatic tires and which provides a much longer operating life than that of pneumatic tires. It is yet a further object of the present invention to eliminate problems associated with punctuation of pneumatic tires.

A preferred embodiment of the present invention includes a kind of non-pneumatic tire for mounting on a wheel rim having an inner surface with at least one circumferential groove around the entire tire. A plurality of circumferentially and evenly distributed, radially extended spacers separate the groove into multiple evenly distributed and mutually spaced chambers, within which air near atmospheric pressure may flow. When the tire is mounted on a wheel rim and the accompanying load does not reach a predetermined value, the fringe parts near both sides of the inner surface will tightly engage the surface of the wheel rim, while the middle part will not make contact with the wheel rim surface. The multiple chambers spaced by multiple spacers therefore permit flow and equal distribution of air. When the load acting on the tire reaches the predetermined value, depending upon the elasticity of the tire, the middle portion of the inner surface of the tire located at the loaded position will also contact the wheel rim surface. The chambers at this position will be air-tight and the load will therefore be distributed evenly by the sidewalls and spacers of the tire. The non-pneumatic tire consists of plies and outer and inner rubber coats. The hardness of the outer rubber coat is higher than that of the inner rubber coat, and spacers are made of rubber having even less hardness than that of the inner rubber coat.

The present invention involves a manufacturing process including the following steps: placing the plies and the outer caoutchouc coat in succession on the molding drum of a molding machine, and then removing them from the molding machine; placing the inner caoutchouc coat and the caoutchouc used for forming the spacers on the inner surface of what has been made and then feeding the mass to a mold-fixing machine to be fixed into a raw tire; placing the raw tire into a vulcanizing machine with a mold-unloading device in it which includes multiple radially extendible and returnable chamber-forming dies on the outer cylindrical surface of the machine used to form the chambers; feeding the raw tire to the vulcanizing machine, to form required chambers on the inner surface of the raw tire by radially pushing out the chamber-forming dies, and then vulcanizing the raw tire.

The present invention involves another manufacturing process including the following steps: placing the plies and the outer caoutchouc coat in succession on the molding drum of a molding machine, then removing it from the molding machine and feeding the mass to a mold-fixing machine to be fixed into a raw tire; providing another molding drum on whose outer surface are chamber-forming dies with a complementary shape with respect to the inner surface of the tire; forming a skeleton with multiple ports or chambers on a second molding drum by using the inner caoutchouc coat and the caoutchouc used to form the spacers, the skeleton then together with the molding drum is semivulcanized; after the removal of the molding drum, putting the skeleton into the fixed raw tire, and then vulcanizing.

The features and advantages of the present invention will become apparent through the following description taken in conjunction with the attached figures, wherein.

Figure 1:
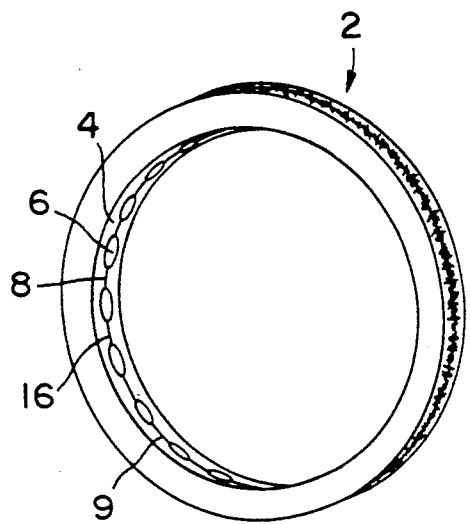
FIG. 1 is a side view of the tire in accordance with the first embodiment of the present invention.
Figure 2:
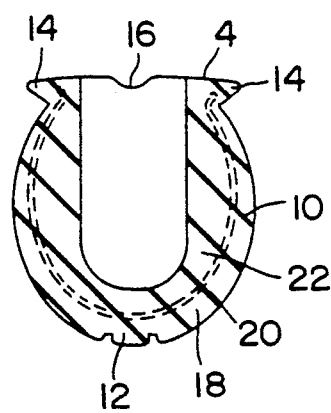
FIG. 2 is a cross-sectional view of the tire shown in FIG. 1.

Shown in FIG. 1 is a first embodiment of the present invention, which is a tire used in bicycles (or the like) and whose size and shape are identical to those of common bicycle tires. On inner surface 4 of the tire 2 is a row of chambers 6 circumferentially and evenly distributed around the entire tire. Chambers 6 are separated from each other by multiple spacers 8 which are circumferentially and evenly distributed and extend radially along a circumferential groove 9 located within the inner surface 4 of the tire 2. Turning now to FIG. 2, the chambers 6 each have substantially the same radial cross section from its opening to bottom and spacers 8 are integrated with sidewalls 10 and bottom 12 of the tire 2 through vulcanization, which produces a supporting skeleton for the tire 2. The inner surface 4 of tire 2 protrudes outwards to be complementary to the surface shape of the wheel rim. Both sides of the tire 2 have tire beads 14 which are the same as those of outer covers of common tires. At the top of each spacer 8, there is a shallow arc slot 16 near the middle of the spacer top. The tire 2 consists of an outer rubber coat 18, plies 20 and an inner rubber coat 22. In the optimum embodiment of the present invention, each of the coats 18 and 22 consists of four layers of rubber. In the tire 2, hardnesses of the rubber used in different portions differ from each other; the hardness of the triangular tire beads 14 is the highest, the hardness of the layers in outer rubber coat 18 and inner rubber coat 22 increase gradually from inside to outside, and the rubber used for spacers 8 is the softest. Also, there is a layer of wear-resistant rubber on the outer surface of the tire 2.

After the tire 2 has been mounted onto a wheel rim, both sides of inner surface 4 of tire 2 tightly contact the wheel rim surface. When the tire is not under loading or the load does not reach a predetermined value, the middle portion of inner surface 4 of tire 2, where the shallow slot is located, will not contact the wheel rim surface. At this time, air is kept in each chamber 6 with a pressure equivalent to atmospheric pressure, and air in all chambers communicates through shallow slot 16.

When a load acting on the tire reaches the predetermined value, which depends on the elasticity of the tire 2, the middle portion of inner surface 4 of the tire 2, where shallow slot 16 is located, will also contact the wheel rim surface, thus making the chambers 6 at the loaded position air-tight. At this time, the load being carried is distributed evenly along the sidewalls 10 and the supporting skeleton (spacers 8).

The air in chambers 6 of tire 2, during travel, is under compression alternatively and brings about recoil. This makes the tire 2 rich in flexibility. The feature that rubber layers become more and more soft from outside to inside of the tire 2 has also improved the flexibility of the tire 2, thus increasing rider comfort. In addition, shallow slot 16 at the middle portion of inner surface 4 of the tire 2 facilitates the mounting and removing of the tire 2 and makes the tire 2 engage the wheel rim more firmly while the tire 2 is under compression during travel.

Figure 3:
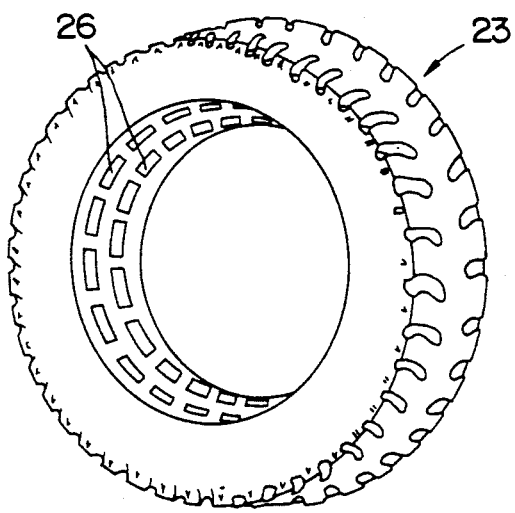
FIG. 3 is a side view of a tire in accordance with the second embodiment of the present invention.
Figure 4:
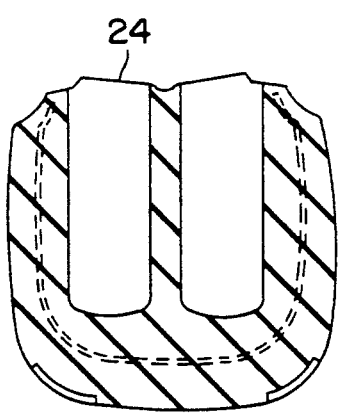
FIG. 4 is a cross-sectional view of the tire shown in FIG. 3.

Shown in FIG. 3 is a second embodiment of the present invention, which is the tire 23 used in automobiles. Here like components will be indicated by like numbers. For the purpose of briefness and clarity of description, features similar to those in the first embodiment will not be described here. The difference between this embodiment and the first one is that in this embodiment there are two (or more than two, if necessary) rows of circumferentially and evenly distributed chambers 26 on inner surface 24 of the tire 23. The rows of chambers 26 are arranged in a staggered fashion. To this end, the spacers for different rows of chambers 26 are also arranged in a staggered fashion. The inner surface 24, as shown in FIG. 4, of the tire 23 has a concave arc shape. Therefore, when the tire 23 is mounted on the wheel rim and the load being carried does not reach a predetermined value, and because of the flatness of the wheel rim surface of an automobile, an air passage to connect all the chambers 26 can be formed between the concave arc surface 24 of the tire 23 and the wheel rim surface. When the load reaches the predetermined value, which depends upon the elasticity of the tire 23, the concave arc surface 24 at the loaded position will also contact the wheel rim surface, thus making chambers 26 at the loaded position air-tight. This produces a cushioning effect.

In the present invention, different parts of rubber used for the tire are obtained through vulcanization of caoutchouc having different compositions, proportionalities and properties. However, because of the existence of spacers and chambers on the inner surface of the tire, certain difficulties accompany the vulcanization process.

The tire manufacturing process is divided into two categories according to different radii R and radial thicknesses H of the tire.

For tires with R much more than H such as those used for bicycles or manpower vehicles as described above in association with the first embodiment, the manufacturing process consists of: placing a layer of ply on the molding drum of a molding machine; then placing very hard caoutchouc used for the tire beads 14 on both sides; covering the former layer with another layer of ply to make the two form a 45° angle shape; removing what has been formed from the molding machine, and sticking to it the outer caoutchouc coat; removing it from the molding machine, and sticking the very soft caoutchouc used for making the supporting skeleton on the other surface (inner surface). After fixing the above-described mold on the molding machine, a raw tire is made. The raw tire is then fed to a vulcanizing machine provided with a mold-unloading device, on whose cylindrical surface are multiple radially extendible and returnable chamber-forming dies used to form the chambers. Next, the chamber-forming dies are pushed out after the raw tire has been fed to the vulcanizing machine; the tire manufacturing process finishes after a 25 minute vulcanization process at 140° C.

Figure 5:
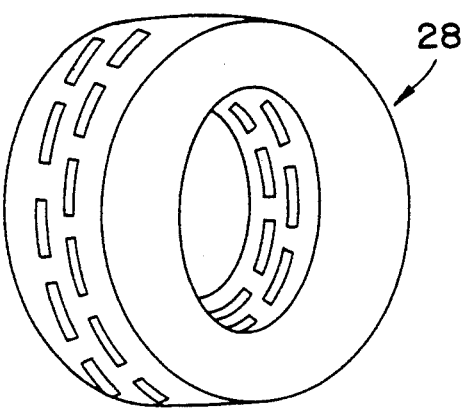
FIG. 5 is the port-bearing skeleton made in accordance with a manufacturing process of the tire of the present invention.

For tires with R slightly more than H such as those used for automobiles as described above in the second embodiment, the manufacturing process consists of: first, in a similar manner previously described, an outer raw tire is made by molding the plies and an outer caoutchouc coat on a then fixing the mass in a mold-fixing machine; then, on a second molding drum (on whose outer surface are chamber-forming dies having a complementary shape in the inner surface of the tire) molding a supporting skeleton 28 (inner raw tire) having two rows of chambers with spacers positioned therebetween from an inner caoutchouc coat; after that, semi-vulcanizing treatment is done for vulcanizing the supporting skeleton at a temperature of 142° for a period of 40 min., unloading the supporting skeleton from the mold following vulcanization producing the skeleton 28 shown in FIG. 5 immediately putting the inner raw tire into the outer raw tire to make a whole tire and then vulcanizing the whole tire again at a temperature of 160° for a period of 60 min.; finally unloading the mold after vulcanization to produce a tire used for automobiles.

The non-pneumatic tire of the present invention maintains an acceptable state of operation, while pneumatic tires frequently become damaged due to travel, which subjects the tire to cyclic loading when they are not filled with enough air. The tire of the present invention is adequately flexible, has more loading capacity, requires less material consumption and maintains a much longer operating life than that of pneumatic tires. Furthermore, since the chambers of the tire of the present invention have an air pressure near atmospheric pressure, the tire is not as subject to puncture as pneumatic tires. Moreover, the tire of the present invention does not need frequent air filling, thus both reducing energy consumption and increasing user convenience. Vehicles using tires of the present invention do not fail during travel due to broken tires as those equipped with pneumatic tires.

In addition, the performance characteristics of the tire of the present invention, such as loading capacity, flexibility and rolling friction, depend basically on: the composition and proportionality of the caoutchouc used for the spacers which comprises the supporting skeleton; the size, shape and depth of the chambers, and the number and arrangement of the chambers. Thus, according to the requirements for maximum performance, tires to meet different operational requirements can be designed by choosing different parameters or different compositions of caoutchouc used for the spacers. In accordance with different loading capacity requirements, different travelling speed requirements, various kinds of load and impact capabilities as well as adaptability to various climates and various road surface conditions, the size shape, depth, and arrangement of the chambers can be determined by choosing different tire supporting skeletons and by performing various calculations, tests and measurements.

Focusing on bicycles, since the load carried by the front wheel is less than the load carried by the back wheels, special front and back tires can be designed according to the load distribution. Turning now to trucks, the back wheels are loaded more than the front ones; thus, up to four back wheels are generally necessary due to the limitation of loading capacity per wheel if pneumatic tires are used. However, if the tire of the present invention is adopted, it is possible to design the back wheel in such a way as to raise its loading capacity without increasing the number of tires. This is economical, and also simplifies the configuration of trucks.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which will fall within the purview of the subject invention and claims.

We claim:

1. A non-pneumatic tire used in vehicles comprising:
   an inner peripheral surface, an outer peripheral surface and sidewalls;
   at least one circumferential groove positioned within said inner peripheral surface of said non-pneumatic tire, said inner peripheral surface being operable to be mounted upon a wheel rim;
   a plurality of spacers circumferentially distributed about said inner peripheral surface of said non-pneumatic tire, said plurality of spacers radially extending into said at least one circumferential groove such that said at least one circumferential groove is separated into a plurality of serially spaced, radially projecting chambers, each of said chambers having substantially the same radial cross-section from its opening to bottom, and said chambers being at an internal pressure approximately equal to atmospheric pressure; and
   fringe portions located adjacent both sides of said inner peripheral surface of said tire such that, when said non-pneumatic tire is mounted upon a wheel rim, said fringe portions operably engage the surface of the wheel rim;
   said inner peripheral surface of said non-pneumatic tire being operable to contact said wheel rim such that, when said non-pneumatic tire is mounted upon a wheel rim and the load carried by said non-pneumatic tire is such that until a predetermined load value is reached, only said fringe portions of said non-pneumatic tire operably contact the surface of the wheel rim, while the central portion of said inner surface of said non-pneumatic tire remains spaced apart from the surface of the wheel rim, and said plurality of chambers being communicated in series via the space between the surfaces of the wheel rim and said central portion of the tire to allow the passage of air between said plurality of chambers and further, when the load carried by said non-pneumatic tire is increased above the predetermined value, said central portion of said non-pneumatic tire above the predetermined load-carrying point operably contacts the wheel rim such that said plurality of chambers at the load-carrying point from air-tight chambers, and the load being distributed equally among said sidewalls of said non-pneumatic tire and said spacers separating said chambers positioned beneath the load;
   said non-pneumatic tire further comprising an outer rubber coat and an inner rubber coat and plies therebetween, said outer rubber coat having a greater hardness than that of said inner rubber coat, and further said plurality of spacers being composed of a rubber of less hardness than the rubber of said inner rubber coat.

2. A non-pneumatic tire as defined in claim 1 further comprising:
   a plurality of circumferential grooves positioned along said inner peripheral surface of said non-pneumatic tire, each of said circumferential grooves having a plurality of spacers arranged in a manner such that the spacer of one of said circumferential grooves is staggered with respect to the spacers of a second circumferential groove such that said chambers created by said spacers also form a staggered arrangement.

3. A non-pneumatic tire as defined in claim 1 wherein: said inner peripheral surface of said non-pneumatic tire in cross-section is outwardly arcuate, and a central peripheral portion of said inner peripheral surface which does not contact the wheel rim surface has a concave slot which circumferentially locates on the top of said spacers.

4. A non-pneumatic tire as defined in claim 1 wherein: said inner surface of said non-pneumatic tire is concave in side-to-side axial configuration.

5. A non-pneumatic tire as defined in claim 1 wherein: said outer rubber coat consists of at least two layers of rubber, each layer of rubber having a different hardness which gradually increases from the innermost coat to the outermost coat.

6. A non-pneumatic tire as defined in claim 1 wherein: said inner rubber coat consists of at least two layers of rubber, each layer of rubber having a different hardness which gradually increases from the innermost coat to the outermost coat.

7. A non-pneumatic tire as defined in claim 1 wherein: said non-pneumatic tire is coated with a layer of wear-resistant rubber.

* * * * *